United States Patent
Zhou et al.

(10) Patent No.: US 11,056,290 B2
(45) Date of Patent: Jul. 6, 2021

(54) METHOD AND APPARATUS FOR AUTHENTICATING AND DETECTING CIRCUIT BREAKER INTEGRITY

(71) Applicant: Eaton Intelligent Power Limited, Dublin (IE)

(72) Inventors: Xin Zhou, Wexford, PA (US); Zhi Gao, Warrendale, PA (US); James L. Lagree, Robinson Township, PA (US); Brian E. Carlson, Gibsonia, PA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/170,150

(22) Filed: Oct. 25, 2018

(65) Prior Publication Data
US 2019/0148089 A1  May 16, 2019

Related U.S. Application Data

(63) Continuation of application No. 15/809,535, filed on Nov. 10, 2017, now Pat. No. 10,141,128.

(51) Int. Cl.
*G08B 21/00* (2006.01)
*H01H 9/16* (2006.01)
(Continued)

(52) U.S. Cl.
CPC ............ *H01H 9/161* (2013.01); *H01H 9/181* (2013.01); *H02H 1/0061* (2013.01); *H02H 3/04* (2013.01);
(Continued)

(58) Field of Classification Search
CPC ...... H01H 9/161; H01H 9/181; H02H 1/0061; H02H 3/04
(Continued)

(56) References Cited

U.S. PATENT DOCUMENTS

| | | |
|---|---|---|
| 5,166,862 A | 11/1992 | Durivage, III et al. |
| 5,493,279 A | 2/1996 | Dawson et al. |

(Continued)

FOREIGN PATENT DOCUMENTS

| | | |
|---|---|---|
| EP | 2001036 A1 | 12/2008 |
| EP | 3041011 A1 | 7/2016 |

(Continued)

*Primary Examiner* — Mark S Rushing
(74) *Attorney, Agent, or Firm* — Fox Rothschild LLP

(57) ABSTRACT

A circuit breaker apparatus may include a housing, a circuit inside the housing for protecting the conductors and the load of the circuit, a display attached to outside of the housing, a controller, and a power control device. The display may be an electronically-alterable display that does not require power in situations other than changing its state. The power control device may provide power to the controller and the display when the apparatus is being tampered with. When the controller is powered, it may cause the power control device to cause the display to change from a state that indicates that the apparatus is authenticated to another state that indicates that the apparatus has been tampered with. The power control device may include a battery and a switch, or a power harvester, which can be configured to provide power to the controller when the apparatus is being tampered with.

20 Claims, 3 Drawing Sheets

(51) Int. Cl.
*H02H 1/00* (2006.01)
*H02H 3/04* (2006.01)
*H01H 9/18* (2006.01)
*H01H 71/74* (2006.01)

(52) U.S. Cl.
CPC ............. *H01H 2071/7472* (2013.01); *H01H 2219/036* (2013.01); *H01H 2239/032* (2013.01); *H01H 2300/032* (2013.01)

(58) Field of Classification Search
USPC ....................................................... 340/635
See application file for complete search history.

(56) References Cited

U.S. PATENT DOCUMENTS

| 2002/0074990 | A1 | 6/2002 | Shincovich |
| 2011/0110171 | A1 | 5/2011 | Kamp et al. |
| 2011/0174599 | A1 | 7/2011 | Whitaker et al. |
| 2013/0023339 | A1 | 1/2013 | Davis et al. |
| 2014/0254052 | A1* | 9/2014 | Carlino ................... H02H 1/06 361/62 |

FOREIGN PATENT DOCUMENTS

| EP | 3041013 A1 | 7/2016 |
| WO | 2012042364 A1 | 4/2012 |

\* cited by examiner

METHOD AND APPARATUS FOR AUTHENTICATING AND DETECTING CIRCUIT BREAKER INTEGRITY

CROSS-REFERENCE TO RELATED APPLICATION

This application claims priority to and is a continuation of U.S. patent application Ser. No. 15/809,535, filed Nov. 10, 2017, the disclosure of which is incorporated herein by reference in its entirety.

BACKGROUND

This disclosure is related to a method and system for authenticating and detecting the integrity of an electrical equipment, and in particular to whether or not a circuit breaker has been subject to unauthorized tampering.

Circuit breakers (as well as switchgear and other electrical circuit control equipment, hereinafter and collectively "circuit breakers") are designed to provide protection for power distribution systems. Circuit breakers safeguard connected electrical devices and conductors against current overloads and short circuits, thereby protecting people and equipment in the field. A circuit breaker includes a housing assembly that encloses elements of a conductor assembly, an operating mechanism, a trip unit, as well as other elements. The enclosed elements must be made and maintained according to the manufacturer's specifications. Circuit breakers, or specific elements thereof such as, but not limited to, the trip units, which are purchased from unauthorized online resellers and unauthorized local dealers, are often of unknown conditions and origins. For example, a circuit breaker that is advertised as "new" may be a counterfeit of it, or it may contain counterfeit circuit breaker elements. It may be reconditioned, or it may have been tampered with. Such circuit breakers/elements expose users to substantial safety risks and liability, as well as potential lost production revenues.

From an ordinary user's perspective, improperly reconditioned or counterfeit circuit breakers and circuit breaker elements are hard to spot. Ordinary users may not have sufficient technical knowledge and experience to detect or identify any unauthorized product or improper reconditioning/tampering. A problem with known circuit breakers is that they do not include a device for detecting authenticity of circuit breakers, i.e., whether a circuit breaker is made by the original manufacturer or the circuit breaker has been tampered with or improperly reconditioned. Same issues exist for other electrical equipment.

This disclosure describes systems that address at least some of the technical issues discussed above, and/or other issues.

SUMMARY

A circuit breaker apparatus includes a housing, a circuit disposed in the housing, a display attached to an outside surface of the housing, a controller, and a power control device electrically coupled to the display and the controller. The housing may include multiple sections, such as a base and a cover. The circuit connects a power line to a load via conductors and provide circuit protection for the conductors and the load. The power control device may provide power to the controller when the apparatus is being tampered with. When the controller is powered, it may cause the power control device to cause the display to change from a first state to a second state, where the first state indicates that the apparatus is authenticated and the second state indicates that the apparatus has been tampered with.

In some scenarios, the first state may include a state in which a message indicative of no tampering is displayed, or a two-dimensional (2D) barcode containing product information is displayed. The second state of the display may include a state in which: a message displayed in the first state is erased; a blank screen is displayed; or a message indicating that the apparatus has been tampered with is displayed. The display may be an electronically-alterable display that does not require power in situations other than changing its state. Either the first state or the second state may stay in that state when the display has no power.

In some scenarios, the power control device may include an energy storage device, such as a capacitor, which becomes sufficiently charged to power the controller when the apparatus is being tampered with. The circuit breaker may include a battery and a switch, where the switch is configured to connect the battery to the energy storage device when the apparatus is being tampered with. The circuit breaker may also include a power harvester disposed inside the apparatus and configured to charge the energy storage device when the apparatus is being tampered with. The power harvester may charge the energy storage device when the housing is opened between any two sections of the housing.

The circuit breaker apparatus may also include a first RFID tag attached to the apparatus, the first RFID tag containing authentication data therein. The controller of the circuit breaker apparatus may initialize the display to the first state by: retrieving the authentication data from the first RFID tag; retrieving a key stored external to the apparatus; using the key to determine whether the authentication data retrieved from the first RFID tag is valid; and upon determining that the authentication data retrieved from the first RFID tag is valid, causing the power control device to initialize the display to the first state.

In some scenarios, the controller may determine whether the apparatus has been tampered with before causing the power control device to cause the display to change from the first state to the second state. The step of such determination may include: retrieving the authentication data from the first RFID tag; retrieving the key stored external to the apparatus; using the key to determine whether the authentication data retrieved from the first RFID tag is valid; and upon determining that the authentication data retrieved from the first RFID tag is invalid, determining that the apparatus has been tampered with.

The circuit breaker apparatus may also include a second RFID tag containing authentication data therein and attached to the apparatus. The controller may initialize the display to the first state by additionally: retrieving the authentication data from the second RFID tag; using the key to determine whether the authentication data retrieved from the second RFID tag is valid; and upon determining that both the authentication data retrieved from the first RFID tag is valid and the authentication data retrieved from the second RFID tag is valid, causing the display to initialize to the first state. In some scenarios, the first RFID tag may be attached to the cover of the housing, and the second RFID tag may be attached to the base of the housing. In some scenarios, either the first RFID tag or the second RFID tag may be an active RFID chip, and the power control device may power the first and/or second RFID tag when the apparatus is being tampered with.

Various methods for authenticating and detecting integrity of a circuit breaker may be implemented in the apparatus. A method for detecting integrity of a circuit breaker may include: by a power control device of the circuit breaker, providing power to a controller of the circuit breaker when the circuit breaker is being tampered with; by the controller of the circuit breaker, when powered, causing the power control device to cause a display attached to an outside surface of the circuit breaker to change from a first state to a second state. The first state may indicate that the circuit breaker is authenticated and the second state may indicate that the circuit breaker has been tampered with.

The method may also include: by the controller, initializing the display to the first state by: retrieving authentication data from a first RFID tag attached to the circuit breaker; retrieving a key stored external to the circuit breaker; using the key to determine whether the authentication data retrieved from the first RFID tag is valid; and upon determining that the authentication data retrieved from the first RFID tag is valid, causing the power control device to initialize the display to the first state.

The method may also include: by the controller, determining whether the circuit breaker has been tampered with before causing the power control device to cause the display to change from the first state to the second state. The determination of whether the circuit breaker has been tampered may include: retrieving the authentication data from the first RFID tag; retrieving the key stored external to the circuit breaker; using the key to determine whether the authentication data retrieved from the first RFID tag is valid; and upon determining that the authentication data retrieved from the first RFID tag is invalid, determining that the circuit breaker has been tampered with.

The method may further include: by the controller, initializing the display to the first state. The step of initializing the display to the first state may additionally include: retrieving authentication data from a second RFID tag attached to the circuit breaker; using the key to determine whether the authentication data retrieved from the second RFID tag is valid; and, upon determining that both the authentication data retrieved from the first RFID tag is valid and the authentication data retrieved from the second RFID tag is valid, causing the display to initialize to the first state.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document, the terms "controller" and "controller device" mean an electronic device or system of devices configured to command or otherwise manage the operation of one or more other devices. A controller will typically include a processing device, and it will also include or have access to a memory device that contains programming instructions configured to cause the controller's processor to manage operation of the connected device or devices.

In this document, the terms "memory" and "memory device" each refer to a non-transitory device on which computer-readable data, programming instructions or both are stored. Except where specifically stated otherwise, the terms "memory" and "memory device" are intended to include single-device embodiments, embodiments in which multiple memory devices together or collectively store a set of data or instructions, as well as one or more individual sectors within such devices.

In this document, the terms "processor" and "processing device" refer to a hardware component of an electronic device (such as a controller) that is configured to execute programming instructions. Except where specifically stated otherwise, the singular term "processor" or "processing device" is intended to include both single processing device embodiments and embodiments in which multiple processing devices together or collectively perform a process.

The term "message" in this document refers to any text or graphics that may be output on a display and visible to a user. For example, the message may be plain English text, or the message may also be a symbol, a logo, or a two-dimensional (2D) barcode, such as a matrix code or QR code. The 2D barcode may contain data, such as product information.

The term "tampering" as used for tampering with a circuit breaker refers to making unauthorized alterations to the circuit breaker, where such alterations may cause one or more parts of the circuit breaker to become loose or have non-manufacturer authorized parts installed. The alteration may include various types of actions done to the breaker. For example, the alteration may include opening the circuit breaker's housing so that at least two sections of the housing become apart. The alteration may also include peeling the warranty seal of the breaker. The alteration may also include an incidental impact to the breaker beyond normal use, such as dropping the breaker to the ground or causing the breaker cover and base to separate.

Figure 1:
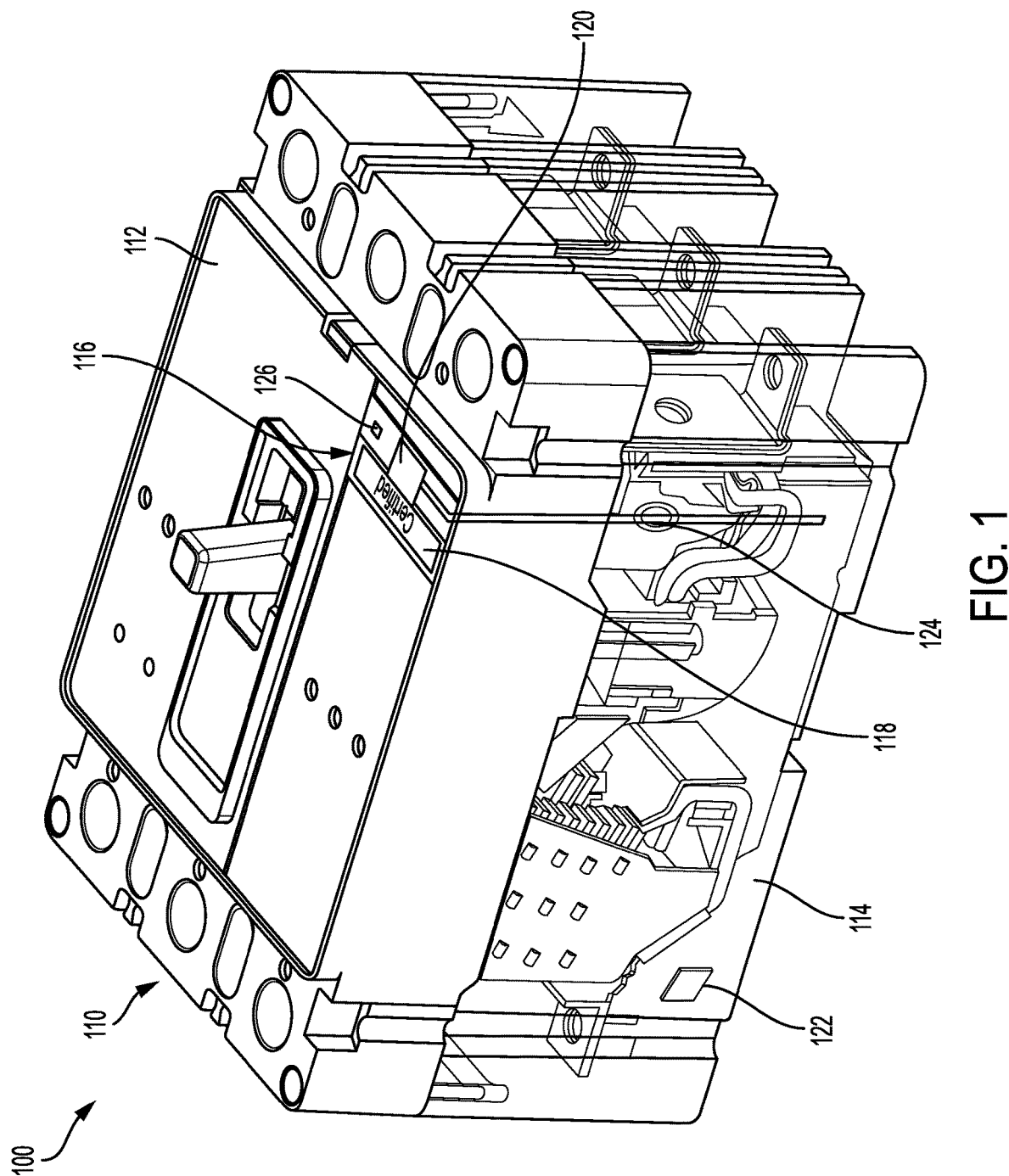
FIG. 1 is a schematic, isometric view of an example of a circuit breaker with tampering detection and authentication.

FIG. 1 illustrates an example of a circuit breaker 100, which includes a housing 110. The housing includes multiple sections, such as a first section 112 and a second section 114, that together form a sealed enclosure. Each of the first or second section 112, 114 of the housing 110 may be the cover and the base of the housing, respectively. Housing 110 may enclose therein a circuit which is configured to connect a power line to a load via conductors, and to provide circuit protection for the conductors and the load. Conductors may include busbars, conductive traces, wiring, cables or other conductive materials. The circuit includes a number of elements which directly affect the operation of the circuit breaker. These number of elements of the circuit breaker may include, for example, a set of contacts, an operating mechanism, a trip unit, an auxiliary switch, an under voltage relay, a bell alarm switch (not shown) or a combination thereof.

The circuit breaker 100 may also include a display 116 attached to an outside surface of the housing. For example, the display 116 may be attached to the cover 112 or the base 114 of the housing so that it is viewable to the user. The display 116 may have two states: an initial state and a second state. The initial state may indicate that the circuit breaker is authenticated and has not been tampered with. For example, the display may output a genuine logo "UL Certified" 118 to indicate authenticity to the user. The display may alternatively output a message, such as "This unit is certified." The initial state of the display may be set by the manufacturer. In a non-limiting example, when the circuit breaker is in the factory sealed state and has not been tampered with, the display is in the initial state indicating no tampering, such as outputting a genuine logo.

The second state of the display 116 may indicate that the circuit breaker has been tampered with. For example, the second (tampering) state may include outputting a message indicating that the apparatus has been tampered with, such as a text message "This unit is void." Alternatively, the second (tampering) state may also include erasing the content of the display in the initial state, for example, the genuine logo "UL Certified" disappears from the display. Alternatively, the second (tampering) state may also include showing a blank screen on the display.

Figure 2:
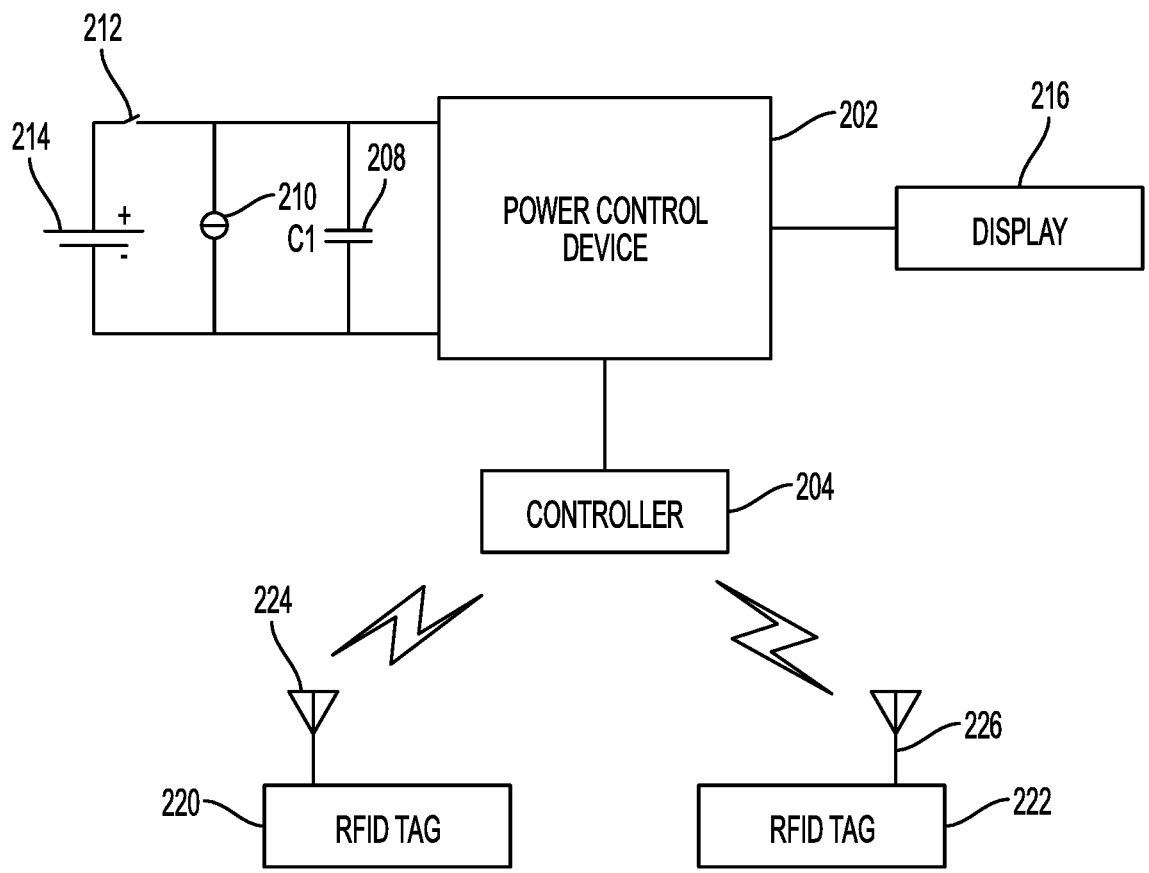
FIG. 2 illustrates some components of the circuit breaker in FIG. 1.

In some scenarios, the circuit breaker may include components that are configured to respond to a tampering event with the circuit breaker by causing the display to change from the initial state to the second (tampering) state. With reference to FIG. 2, in some scenarios, the circuit breaker may include a controller 204 disposed inside the housing (110 in FIG. 1). The circuit breaker may also include a power control device 202 electrically coupled (e.g., via direct or indirect connection) to the controller 204 and to the display 216 to provide power to the controller and control the display in response to a situation where the apparatus is being tampered with.

In some scenarios, the display is an ultra-low power display unit. For example, the display may be an electronically-alterable display that does not require power in situations other than changing its state. The state of the display may be alterable through the application of an external power without requiring any circuitry in the display itself. In other words, the display may stay in the last state without any circuitry or power. For example, U.S. Pat. No. 7,284,708 discloses an electronically-alterable display that includes bichromal materials which may change orientation in response to an external field, where the orientation of the bichromal material may determine a state of the display, such as an image or value. In a non-limiting example, a charge may be applied to certain areas of the display, for example, an area forming a letter "O," and accordingly the corresponding bichromal material in the display may form the letter "O."

In another non-limiting example, the ultra-low power display unit may be made of the electronic paper display (EPD). An EPD is a display device that only requires power to change the displayed image, and does not require power to maintain the image once displayed. EPDs may rely on electrophoresis to move, turn or otherwise rearrange conductive particles that form the displayed image in response to a selectively applied charge. A message displayed in the EPD can still stay visible when there is no power to the display. As such, the genuine logo on the circuit breaker will still remain visible during normal circuit breaker operation and even when there is a total loss of electrical power. Example manufacturers of EPDs include E Ink, Liquivista, and Plastic Logic.

In some scenarios, when the display is in the initial state, such as when the circuit breaker is released from the factory, the power control device 202 does not direct the power to the controller 204 and the display 216, and in that state the content on the display cannot be altered. In some scenarios, the circuit breaker may be configured to provide power to the controller 204 to allow the display to change from the initial state to the second (tampering) state in response to an occurrence of a tampering event with the circuit breaker. To change the display of the ultra-low power paper, there is only little external power required, and there can be various ways to obtain such power that will be described below.

In some scenarios, the power may be provided by a battery 214 connected to a switch 212. The switch 212 may be configured to connect the battery 214 to the power control device 202 when the circuit breaker is being tampered with. In a non-limiting example, the switch 212 may be a mechanical switch and attached to the housing of the circuit breaker. The contact points of the switch may be positioned to be open when the housing is closed and close when the housing is opened between at least two sections of the housing. For example, the switch 212 may be a magnetic sensor switch such as a reed relay that has two parts. The first part may have a set of contacts therein and may be attached to one section of the housing, such as the cover. The second part of the switch may have a magnet that may be positioned in proximity to the first part of the switch. For example, the second part of the switch may be attached to another section of the housing, such as the base, and aligned with the first part. When the housing is closed, the second part will stay within a proximity to the first part, and the contacts in the first part will stay open. When the housing is opened between the cover and the base, the displacement between the cover and the base of the housing will cause the second part of the switch to be displaced from the first part, which displacement will cause the contacts in the first part to close. In such a case, the switch will connect the battery 214 to the power control device 202.

Alternatively, and/or additionally, the power required to power the power control device 202 may be provided by a power harvester 210 that is connected to the power control device 202 and is configured to generate power when the circuit breaker is being tampered with.

In a non-limiting example, as shown in FIG. 1, the power harvester 124 may be disposed inside the housing 110. The power harvester 124 may have a coil and a magnet that are disposed inside the housing and that are magnetically couplable to each other. Each of the coil and magnet may be attached to a part of the housing. For example, the coil may be attached to the cover of the housing, and the magnet may be attached to the base of the housing. When the housing is closed, the coil and the magnet may be coupled. For example, the magnet may be positioned inside the coil. When the housing is opened, the magnet may be moved relative to the coil. For example, the magnet may be moved out of the coil. Such motion may generate electrical current inside the coil, which will cause the power harvester to generate power.

Returning to FIG. 2, in some scenarios, the power control device also includes an energy storage device 208, for example, a capacitor, that becomes sufficiently charged by either the battery 214 or the power harvester 210 to power the controller 204 when the apparatus is being tampered with.

When the circuit breaker is being tampered with, the controller 204 will transition from a state of no power to a state of power. In some scenarios, the controller 204 may be configured to cause the display to change its state when the controller is powered up. For example, when controller 204 is powered up (by the power control device), it may automatically transmit a signal to cause the power control device 202 to cause the display 216 to enter into a tampering state indicating that the circuit breaker has been tampered with. For example, the display may output a message indicating that the circuit breaker has been tampered with. Alternatively, at power-up, the controller 204 may be configured to cause the power control device 202 to erase the message displayed in the initial state. Once the display is transitioned to the tampering state, it cannot change back to the initial state unless the display is reset. In such a way, via the state of the display, the user may recognize that the circuit breaker has been tampered with and is not genuine.

In resetting (i.e. initializing) the display to the initial state, the controller 204 may be configured to use authentication data, which may be stored in one or more RFID tags (i.e. RFID chips) 220, 222 attached to the circuit breaker housing. In some scenarios, the controller 204 may be in communication with the one or more RFID tags 220, 222 in any suitable wireless communication, e.g., near field communication (NFC). The controller 204 is further configured to read or cause a RFID reading device to retrieve authentication data off of the one or more RFID tags 220, 222, via the antennas 224, 226 of each RFID tag, and validate the authentication data. Additionally, in validating the authentication data, the controller may also retrieve a key, such as a factory or vendor key, and use the key to determine whether the authentication data retrieved from the RFID tag is valid. In some scenarios, the factory or vendor key is stored at a factory or vendor site and is not contained anywhere in the circuit breaker. In such a way, the display cannot be initialized or reset unless it is done at the factory site. The authentication process is further described in detail below.

Each RFID tag may store a RFID message, which may be in any format, for example, the Near Field Communication (NFC) Data Exchange Format, referred to as NDEF. Each RFID message may include a signature record and a data record. In some scenarios, the RFID message may be in the NFC forum signature record type definition (RTD) security protocol, in which the message is a signed NDEF message and contains a data record and a signature record. The length of data record and signature record can be pre-defined. Each RFID tag may also contain a digital certificate that will be used for the authentication process.

In some scenarios, the data record may be a message payload and may be of various length. The data record may have a length in the range of a few bytes to a few hundred bytes. For example, the data record may be in plain-text format and include a text message, such as "Genuine Circuit Breaker." The data record may also include other information, such as the circuit breaker style number, a date of manufacture code, a quality process control code, or the serial number of the circuit breaker.

In some scenarios, a system may obtain the signature record by applying a hash function, such as SHA-2 (Secure Hash Algorithm 2), to the data record to produce an intermediate message digest. The message digest can be of various lengths, such as 256 or 512 bits in length. The system may further encrypt, also known as sign, the message digest with a secret factory or vendor key to determine the signature record. In some scenarios, the signature record can be of various length, such as in a range from ten to a few hundred bytes. Optionally, the signature record may appear as a random alphanumeric code.

The controller may use the signature record to verify that the data record is not corrupted and authenticate that the data record is created by the party who holds the factory or vendor key.

Figure 3:
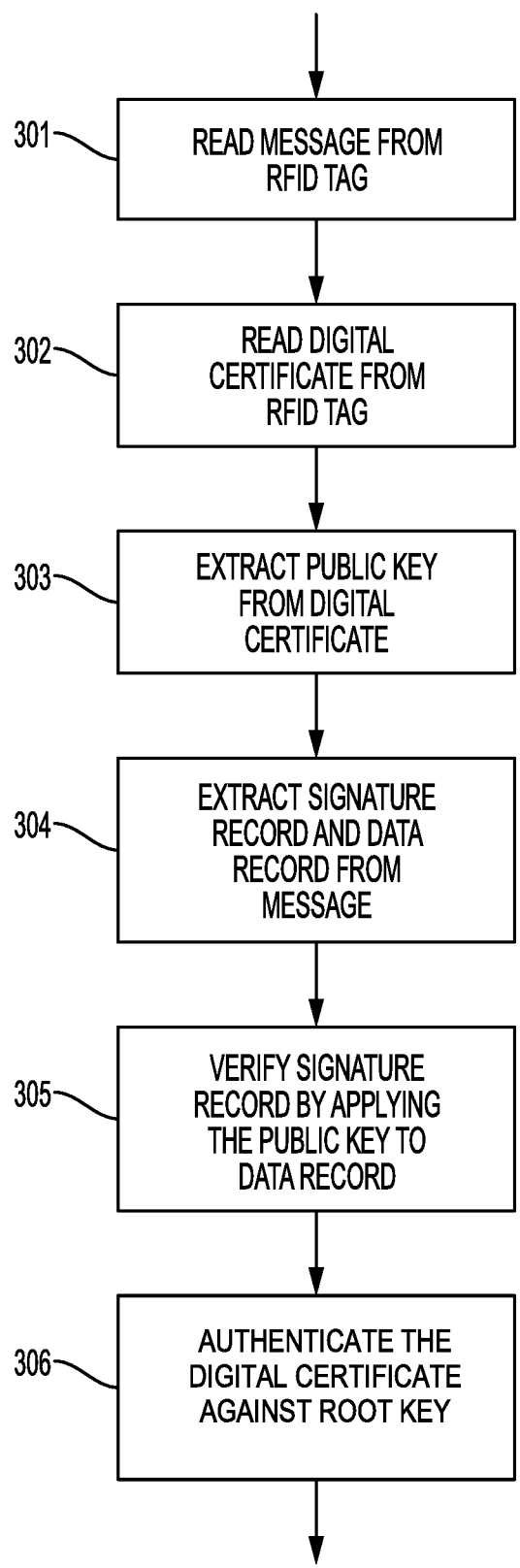
FIG. 3 illustrates an example of an authentication process by a controller of the circuit breaker in FIG. 1.

In FIG. 3, an example of an authentication process performed by the controller may include: reading a message from a RFID tag 301; reading a digital certificate from the RFID tag 302; extracting a public key from the digital certificate 303; extracting a signature record and data record from the message 304; verifying the signature record by applying the public key to the data record 305; and authenticating the digital certificate against a root key 306. If the signature record is verified to be valid and the digital certificate is also authenticated, the controller may determine that the circuit breaker is genuine and authenticated. The controller then may send a signal to the power control device to cause the display to initialize (or reset) to the initial state. If either the signature record or the digital certificate is invalid, the controller may determine that the circuit breaker has been tampered with and send a signal to the power control device to cause the display to change to the tampering state such as erasing the message on the display.

Alternatively, and/or additionally, in response to an occurrence of a tampering, such as when the housing is open, the controller may be configured to perform the authentication process in FIG. 3 to determine whether the circuit breaker has been tampered with before causing the power control device to cause the display to erase the message on the display (i.e., changing to the tampering state). Optionally, the controller may repeat the authentication process in FIG. 3 a number of times. If the authentication process still fails after the number of tries, i.e., no valid signed NDEF message or digital certificate can be obtained from the RFID tags, then the controller may determine that the circuit breaker has been tampered with. The controller may subsequently issue a command to the power control module to apply an erase voltage to the display to erase any genuine logo previously displayed. Alternatively, the controller may also cause the display to output a message indicating that the circuit breaker has been tampered. If the controller successfully completes the authentication process in FIG. 3, then the controller may standby and not issue any command to the power control device to cause the display to change state. In other words, the display continues to display the genuine logo that is displayed.

Alternatively, and/or additionally, the controller may be in communication with multiple RFID tags (e.g., 220 and 222 in FIG. 2). The controller may be configured to repeat the authentication process for each of the RFID tags. When the authentication process for all of the RFID tags succeeds (i.e., all signed NDEF messages and digital certificates obtained from the RFID tags are valid), the controller determines that the circuit breaker is genuine and the display continues to display the genuine logo. If the authentication process fails for any of the RFID tags, then the controller may determine that the circuit breaker has been tampered with and subsequently issue a command to the power control device to cause the display to change to the tampering state.

In verifying the authentication data and the key, in some scenarios, the controller 204 may use a public key infrastructure (PKI). For example, a public key may be stored in each of the RFID tags, and the private key is the root key that is stored at the factory site. The root key is not stored in the circuit breaker. In the authentication process in FIG. 3, the controller may be configured to retrieve the root key from a source external to the circuit breaker via a memory interface (126 in FIG. 1) of the circuit breaker. For example, the root key may be stored in an external memory, and the memory interface, may be configured to communicate, wired or wirelessly, with the external memory to be able to retrieve the root key.

In some scenarios, the root key is stored in a non-volatile memory in a root RFID tag. This installation may occur before the circuit breaker is shipped from the manufacturer to distributors or others, such as at the factory site. The root RFID tag may be physically stored and held by the manufacturer or a representative of the manufacturer, such as at the factory site, and is not distributed with the product. The memory interface (126 in FIG. 1) may be a RFID reader that is configured to communicate with a RFID tag to be able to read data stored in the memory of the RFID tag. Although the root RFID tag is not attached to any circuit breaker, any modification of a circuit breaker would require the presence of this root RFID tag in close proximity to the circuit breaker. If the root RFID tag is absent when the circuit breaker is being modified, the controller may determine that the circuit breaker has been tampered with by an unauthorized party, and subsequently issue a command to the power control device to cause the display to change to the tampering state. As such, someone who has tampered with the circuit breaker, which causes the display to change to the tampering state, cannot reset the display to its initial display because no root key is available.

Returning to FIG. 1, the one or more RFID tags may each be attached to a part of the circuit breaker to provide authenticity. For example, a first RFID tag 120 may be attached to the cover 112 of the housing and the second RFID tag 122 may be attached to the base 114 of the housing. Alternatively, and/or additionally, a RFID tag may be attached to a critical component of the circuit breaker, so that when that critical component is replaced by an aftermarket part, no correct RFID tag will be read and the authentication will fail. The RFID tag can be passive or active. If the RFID tag is active, the power control device (202 in FIG. 2) may be configured to further power the RFID tag in response to detecting that the circuit breaker has been tampered with.

The above illustrated embodiments provide advantages over the existing systems. For example, the low-power display, such as the electronic paper, can maintain the message on the display when there is no electrical power and would need only a little power to change the display. This small amount of power can be generated by a movement associated with the opening of the housing, via a power harvester. Further, the present solution uses an authentication process to initialize the display to a no tampering state or authenticate before changing the display to a tampering state in response to detecting that the circuit breaker has been tampered with. This authentication process requires readings of authentication data from RFID tags and a key that is only accessible to a factory. This effectively prevents anyone from initializing the display after tampering with the circuit breaker.

The features and functions described above, as well as alternatives, may be combined into many other different systems or applications as appreciated by one ordinarily skilled in the art. For example, the housing may have more than two parts: a cover, a base and a middle part. The display may be attached to any part of the housing. There can be any number of RFID tags attached to the circuit breaker. The power harvester may be of other types. Various features may also be used to authenticate and detect integrity of other types of apparatus or equipment as may be appreciated by those skilled in the art. For example, the above illustrated features may be used to authenticate or detect integrity of appliances so that a display that is attached to an outside surface of an appliance's cover may change from a first (initial) state to a second (tampering) state when the appliance has been tampered with.

Various alternatives, modifications, variations or improvements, and combinations may be made by those skilled in the art, each of which is also intended to be encompassed by, the disclosed embodiments.

The invention claimed is:

1. A circuit breaker apparatus comprising:
a housing;
a circuit disposed in the housing and configured to connect a power line to a load via one or more conductors and provide circuit protection for the one or more conductors and the load;
a display that is operable to change from a first state to a second state, wherein:
the first state indicates that the apparatus is authenticated and the second state indicates that the apparatus has been tampered with, and
power is not required to maintain the first state or the second state once displayed;
a controller; and
a power control device electrically coupled to the controller;
wherein:
the display is configured to be in the first state when the apparatus is authenticated and has not been tampered with,
the power control device is configured to provide power to the controller upon detection of tampering with the apparatus, and
the controller is configured to, when powered in response to detection of the tampering with the apparatus and without user intervention, send a signal to cause the display to change from the first state to the second state.

2. The apparatus of claim 1, wherein the power control device comprises an energy storage device that becomes sufficiently charged to power the controller when the apparatus is being tampered with.

3. The apparatus of claim 2, wherein the energy storage device is a capacitor.

4. The apparatus of claim 2, further comprising a battery and a switch, wherein the switch is configured to connect the battery to the power control device when the apparatus is being tampered with.

5. The apparatus of claim 2, further comprising a power harvester disposed inside the apparatus and configured to charge the energy storage device when the apparatus is being tampered with.

6. The apparatus of claim 5, wherein:
the housing comprises a plurality of sections; and
the power harvester is configured to charge the energy storage device when the housing is opened between any two of the plurality of sections of the housing.

7. The apparatus of claim 1, wherein the first state of the display comprises a state in which a two-dimensional barcode containing product information is displayed.

8. The apparatus of claim 7, wherein the second state of the display comprises a state in which:
a message displayed in the first state is erased;
a blank screen is displayed; or
a message indicating that the apparatus has been tampered with is displayed.

9. The apparatus of claim 1 further comprising a first RFID tag attached to the apparatus, the first RFID tag containing authentication data therein, and wherein the controller is further configured to initialize the display to the first state by:
retrieving the authentication data from the first RFID tag;
retrieving a key stored external to the apparatus;
using the key to determine whether the authentication data retrieved from the first RFID tag is valid; and upon determining that the authentication data retrieved from the first RFID tag is valid, causing the power control device to initialize the display to the first state.

10. The apparatus of claim 9, wherein the controller is configured to determine whether the apparatus has been tampered with before causing the power control device to cause the display to change from the first state to the second state, by:
retrieving the authentication data from the first RFID tag;
retrieving the key stored external to the apparatus;
using the key to determine whether the authentication data retrieved from the first RFID tag is valid; and
upon determining that the authentication data retrieved from the first RFID tag is invalid, determining that the apparatus has been tampered with.

11. The apparatus of claim 9, further comprising a second RFID tag containing authentication data therein and attached to the apparatus, and wherein the controller is further configured to initialize the display to the first state by additionally:
retrieving the authentication data from the second RFID tag;
using the key to determine whether the authentication data retrieved from the second RFID tag is valid; and
upon determining that both the authentication data retrieved from the first RFID tag is valid and the authentication data retrieved from the second RFID tag is valid, causing the display to initialize to the first state.

12. The apparatus of claim 11, wherein the first RFID tag is attached to a cover of the housing and the second RFID tag is attached to a base of the housing.

13. The apparatus of claim 9, wherein:
the first RFID tag is an active RFID chip; and
the power control device is further configured to power the first RFID tag when the apparatus is being tampered with.

14. A method of indicating integrity of a circuit breaker, the method comprising:
by a display of the circuit breaker, being in a first state that indicates the circuit breaker is authenticated and has not been tampered with and that does not require power to maintain the first state once displayed;
by a power control device of the circuit breaker, detecting that the circuit breaker is being tampered with, and in response to detecting that the circuit breaker is being tampered with providing power to a controller of the circuit breaker;
by the controller of the circuit breaker, when powered in response to detection of the tampering with the apparatus and without user intervention, sending a signal to cause the display to change from the first state to a second state, wherein:
the second state indicates that the circuit breaker has been tampered with, and
power to the display is not required to maintain the second state once displayed.

15. The method of claim 14, further comprising:
by the controller, initializing the display to the first state by:
retrieving authentication data from a first RFID tag attached to the circuit breaker;
retrieving a key stored external to the circuit breaker;
using the key to determine whether the authentication data retrieved from the first RFID tag is valid; and
upon determining that the authentication data retrieved from the first RFID tag is valid, causing the power control device to initialize the display to the first state.

16. The method of claim 15, further comprising:
by the controller, determining whether the circuit breaker has been tampered with before causing the power control device to cause the display to change from the first state to the second state, by:
retrieving the authentication data from the first RFID tag;
retrieving the key stored external to the circuit breaker;
using the key to determine whether the authentication data retrieved from the first RFID tag is valid; and
upon determining that the authentication data retrieved from the first RFID tag is invalid, determining that the circuit breaker has been tampered with.

17. The method of claim 15, further comprising:
by the controller, initializing the display to the first state by additionally:
retrieving authentication data from a second RFID tag attached to the circuit breaker;
using the key to determine whether the authentication data retrieved from the second RFID tag is valid; and
upon determining that both the authentication data retrieved from the first RFID tag is valid and the authentication data retrieved from the second RFID tag is valid, causing the display to initialize to the first state.

18. The method of claim 16, further comprising, by the power control device, powering the first RFID tag when the circuit breaker is being tampered with.

19. The method of claim 14, wherein the first state of the display comprises a state in which a two-dimensional barcode containing product information is displayed.

20. The method of claim 14, wherein the change from the first state to the second state comprises:
erasing a message displayed in the first state;
displaying a blank screen; or
displaying a message indicating that the circuit breaker has been tampered with.

* * * * *